H. C. HAYES AND G. W. LEWIS.
RECORDING DEVICE.
APPLICATION FILED APR. 13, 1916.

1,334,856.

Patented Mar. 23, 1920.
5 SHEETS—SHEET 1.

Inventors
Harvey C. Hayes
George W. Lewis
by their Attorneys
Howson & Howson

Inventors
Harvey C. Hayes
George W. Lewis
by their Attorneys
Howson & Howson

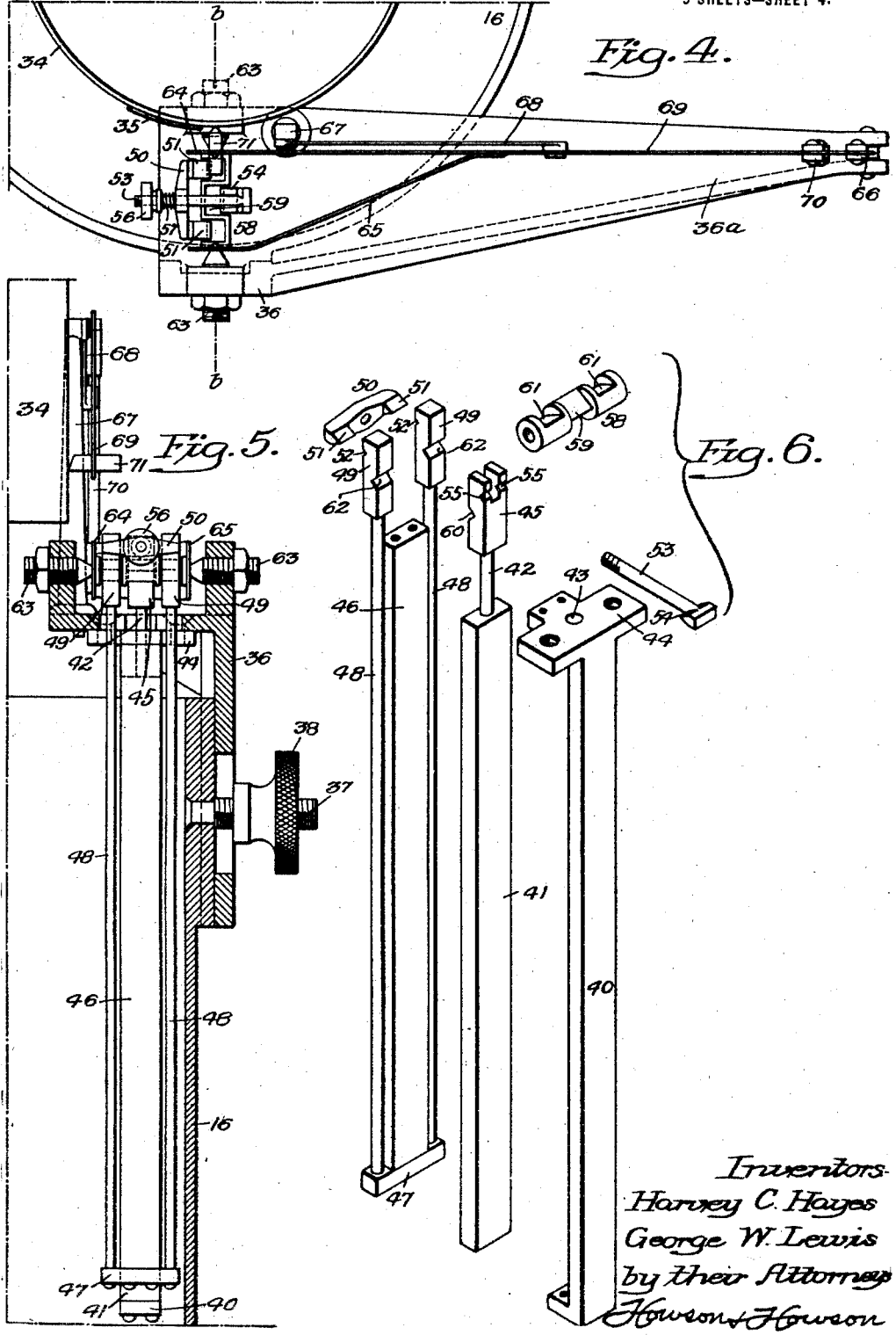

H. C. HAYES AND G. W. LEWIS.
RECORDING DEVICE.
APPLICATION FILED APR. 13, 1916.
1,334,856.
Patented Mar. 23, 1920.
5 SHEETS—SHEET 5.
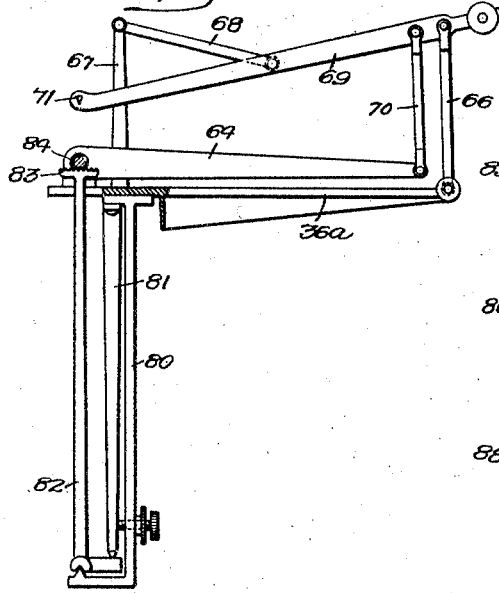
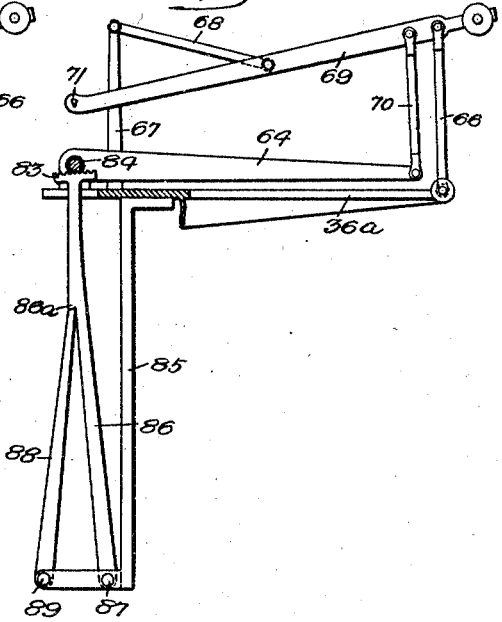
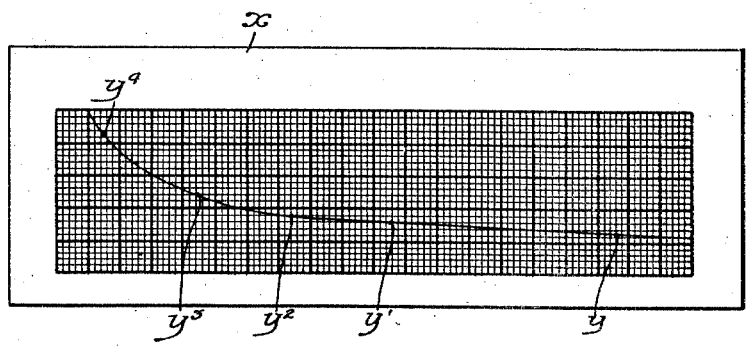
Inventors
Harvey C. Hayes
George W. Lewis
by their Attorneys
Howson & Howson

UNITED STATES PATENT OFFICE.

HARVEY C. HAYES AND GEORGE W. LEWIS, OF SWARTHMORE, PENNSYLVANIA, ASSIGNORS TO THE TINIUS OLSEN TESTING MACHINE COMPANY, OF PHILADELPHIA, PENNSYLVANIA, A CORPORATION OF PENNSYLVANIA.

RECORDING DEVICE.

1,334,856.   Specification of Letters Patent.   Patented Mar. 23, 1920.

Application filed April 13, 1916. Serial No. 90,934.

*To all whom it may concern:*

Be it known that we, HARVEY C. HAYES and GEORGE W. LEWIS, citizens of the United States, and residents of Swarthmore, Delaware county, State of Pennsylvania, have invented Recording Devices, of which the following is a specification.

One object of our invention is to provide a relatively simple, compact and accurate mechanism for obtaining or automatically making a record of the variation of the viscosity of liquids under different temperature conditions, the arrangement of parts being such that the record may be secured in the form of a curve or series of points defining a line which shall graphically illustrate such variation.

We further desire to provide a machine by which viscosity tests may be quickly and conveniently made under substantially uniform speed conditions and at the same or at different temperatures.

These objects and other advantageous ends we secure as hereinafter set forth, reference being had to the accompanying drawings, in which, Figure 1 is an elevation illustrating the preferred form of our apparatus;

Fig. 4 is a plan of the apparatus shown in Fig. 3;

Fig. 5 is a vertical section on the line *b—b*, Fig. 4;

Fig. 6 is a detached perspective view of that form of thermometric mechanism illustrated in Figs. 1 to 5;

Fig. 7 is a plan of a record made by our machine; and

Figs. 8 and 9 are elevations, partly in section, illustrating modified forms of thermometric mechanism which may be employed as part of our invention.

Figure 1:
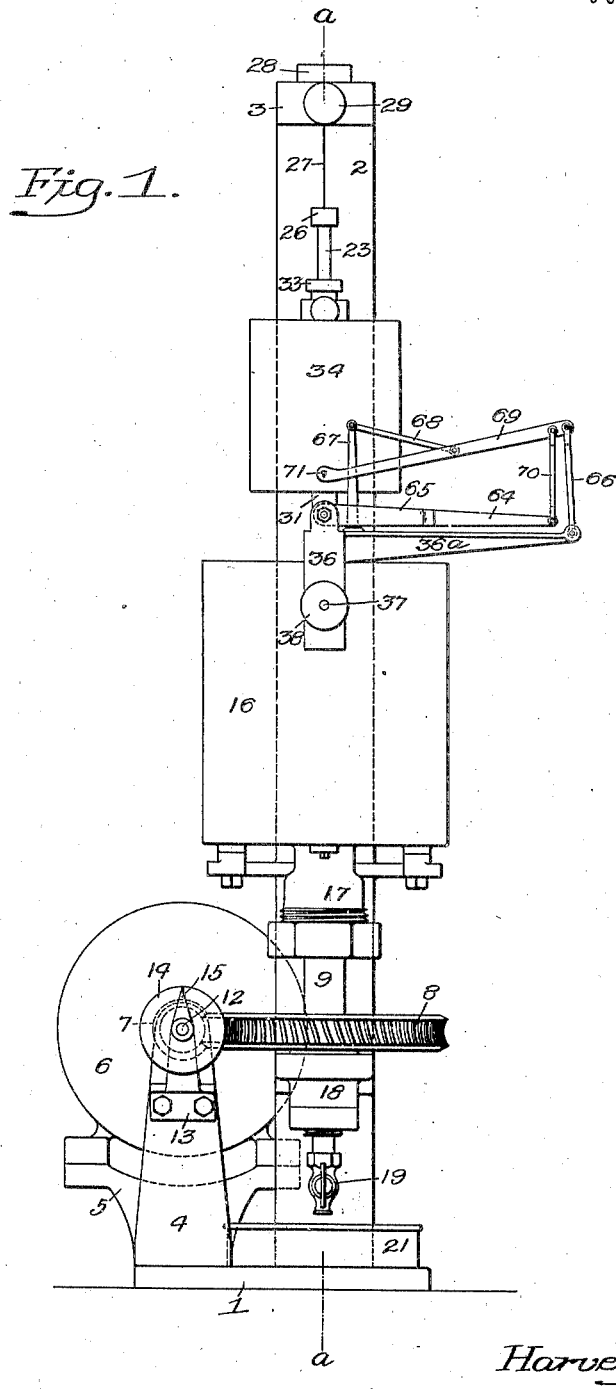

In the above drawings 1 represents a supporting base having a vertically projecting standard 2 terminating in an overhanging arm 3. Also carried by said base are brackets 4 and 5 of which the latter is designed to support a small electric motor 6, to whose shaft is fixed a worm 7 meshing with a worm wheel 8 fixed to a vertical tubular spindle 9. Said motor shaft terminates in a copper or other suitable metal disk 10 mounted immediately adjacent a magnet 11 carried by a shaft 12 supported in bearings provided by a supplementary bracket 13 projecting from the bracket 4. Fixed to one of said bearings is a suitably graduated disk 14 mounted concentrically with the shaft 12 which has fixed to its outer extremity a pointer 15 operative immediately adjacent the graduated face of said disk.

Rigidly supported on the main standard 2 is a container 16 having in its bottom an opening for the passage of the vertical spindle 9 and provided with a stuffing box 17 extended downwardly around said spindle. The lower end of the latter extends through a bearing provided by a projection 18 from the standard 2 and terminates in a cock or valve 19 whereby flow of liquid from a cup 20 fixed to its upper end, may be permitted or cut off at will. A pan 21 may be mounted on the base 1 under this cock to receive any liquid discharged therefrom.

Figure 2:
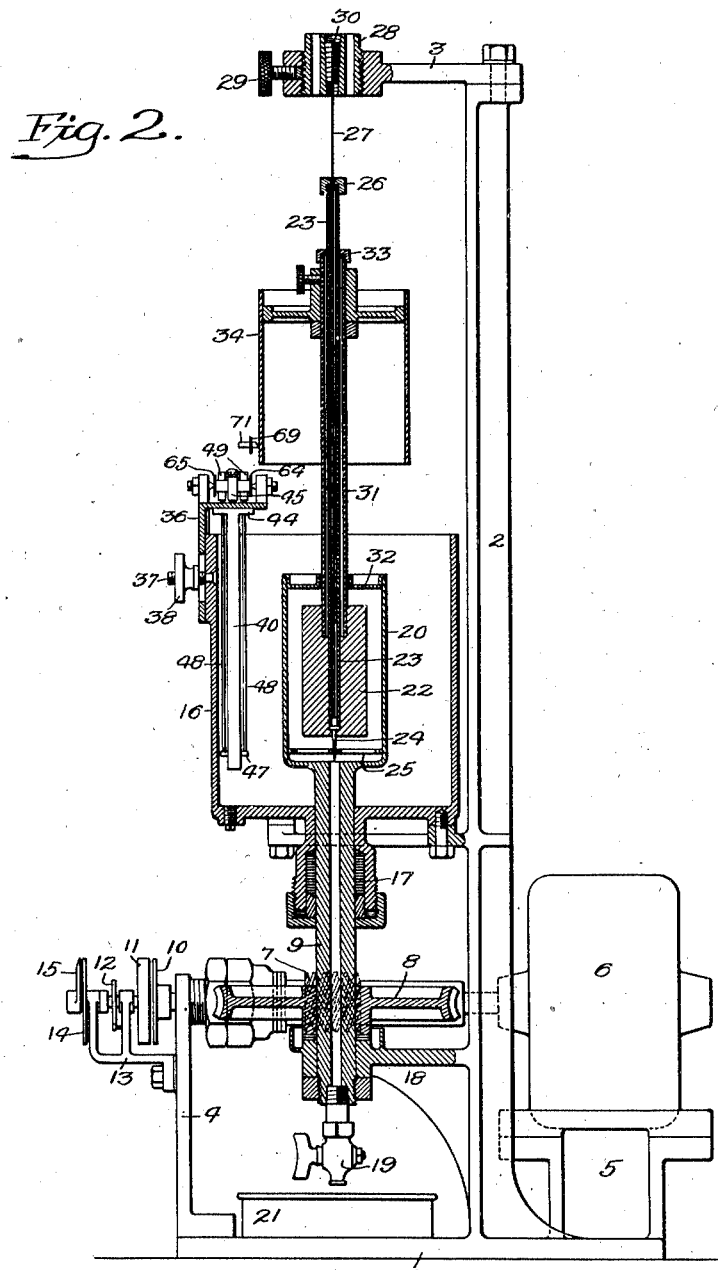
Fig. 2 is a vertical section on the line *a—a*, Fig. 1.

A cylindrical body 22 is mounted concentrically within the cup 20 and has fixed to it a tube 23 whose lower end extends axially from its top to a point immediately adjacent its lower end. This latter has an axially mounted pin or centering member 24 projecting into the central opening of a spider 25 fixed in the bottom of the cup 20 so as to at all times maintain the member 22 central therein. The tube 23 has fixed to its upper end a perforated cap 26 through which passes a suspending member, such as a wire or other filament 27, whose lower end is connected to the member 22 adjacent the lower end thereof, while its upper end is hung from the arm 3 preferably by the means shown in Fig. 2. For this purpose the outer end of said arm has threaded into it a bushing 28 which may be clamped in any adjusted position by a thumb screw 29 and which carries a suspension screw 30 engaging the wire or torsion element 27.

The member 22 also has fixed to its upper end a second tube 31 concentric with the tube 23 and passing loosely through the cover 32 of the cup 20, there being a cap 33 on its upper end whereby it is maintained properly spaced from or centered relatively to said tube 23. Fixed concentrically to this outer tube 31 is a drum 34 on which a record-receiving sheet or card, such as that indicated at $x$ in Fig. 7, may be mounted by any suitable means such as the spring strips 35.

The preferred form of thermometric device used as part of our invention, is illustrated as consisting of a bracket 36 so mounted on the side of the container 16 as to allow of its being raised or lowered as a whole at will, for which purpose it has a vertical slot through which passes a set screw 37 carrying a clamping nut 38. The bracket 36 overhangs the open top of the container 16 and has depending from it into the latter a bar 40 of some material such as "invar" whose coefficient of expansion is practically zero. The lower end of said bar is extended at right angles and has rigidly fixed to it the lower end of a vertically extending bar 41 of some material, such as zinc, which preferably has a comparatively high coefficient of expansion. This latter bar, whose length is preferably slightly less than that of the supporting bar 40 terminates in a rod-like extension 42 slidably guided through an opening 43 in the top portion 44 of said supporting bar and carrying at its upper end a head 45.

Figure 3:
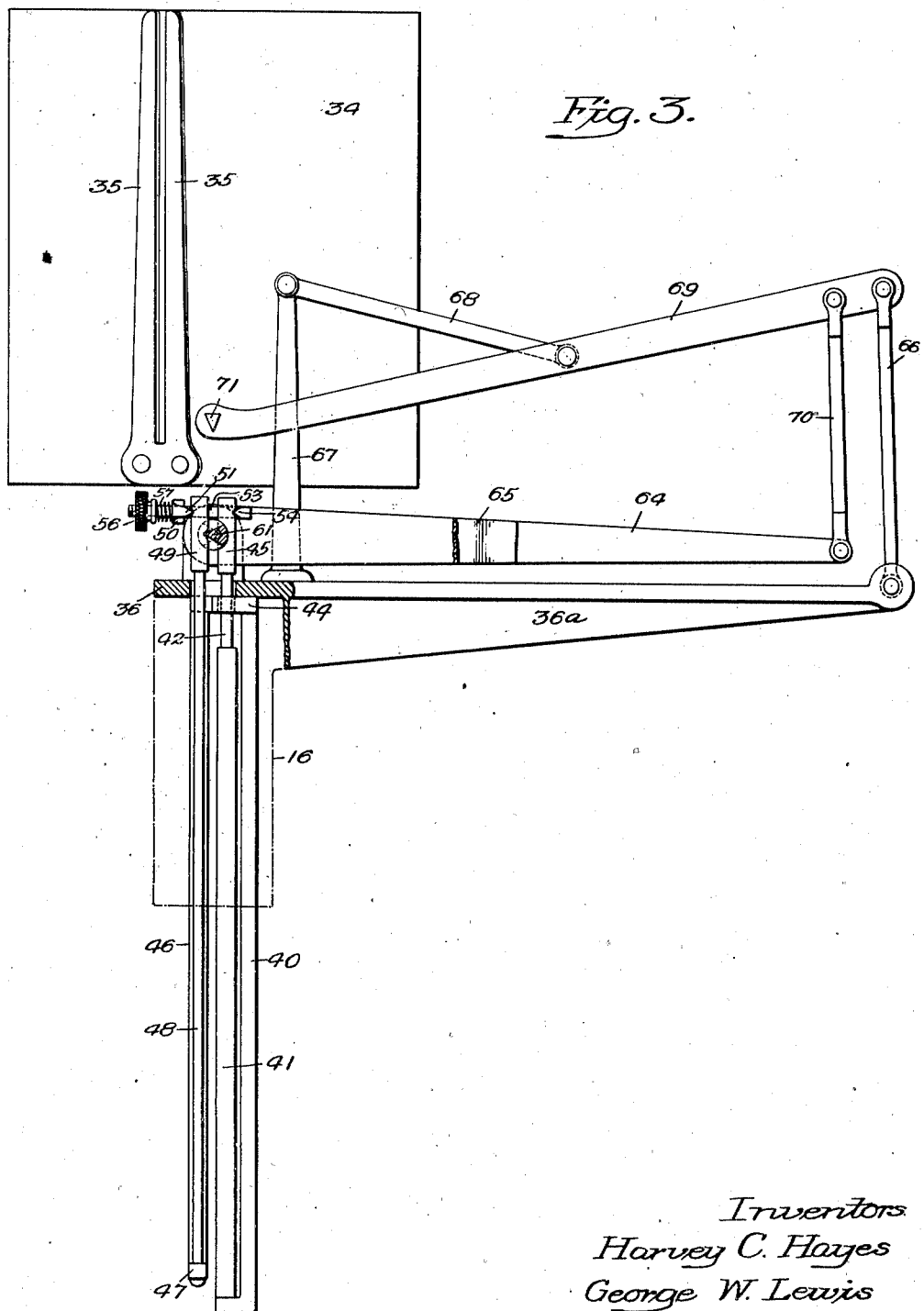
Fig. 3 is an elevation partly in section of one form of the thermometric mechanism forming part of our invention, together with the recording mechanism associated therewith.

Rigidly fixed to and extending down from the top portion 44 of the bar 40 is a second bar 46 also of zinc or equivalent material, whose lower end is rigidly fixed to a cross piece 47 from which two rods 48 extend above the top of the bar 46, where they are provided with heads 49. Extending around the three heads 49—45—49 is a yoke consisting of a cross piece 50 having a pair of knife edges 51—51, respectively operative in notches 52 in the heads 49, while through the center of said piece we extend a rod 53 carrying at one end a knife edge 54 operative in notches 55 of the head 45 and at its opposite end having mounted on it a loose collar 56, having a spring 57 between it and the cross piece 50. Between the heads 49—49 and the head 45 is mounted a pintle 58 having a central knife edge 59 designed to engage a notch 60 in the head 45 and also provided with two other knife edges 61 on either side of and extending oppositely to said central edge, designed to respectively enter notches 62 in the heads 49. This pintle has in its ends conical recesses for the reception of trunnion screws 63 whereby it is rotatably supported on the bracket 36 and it has projecting from its opposite ends two arms 64 and 65, of which the first is prolonged as shown in Fig. 3.

The bracket 36 at its upper end has a projecting arm 36ᵃ to whose extremity is pivoted an upwardly extending link 66, and it also has adjacent its inner end, a vertical standard 67 to whose upper end is pivoted a second link 68. The free ends of both the links 66 and 68 are pivotally connected to a stylus-carrying arm 69, the first adjacent one end thereof and the other at a point near its middle, while a third link 70 extends between the end of the arm 64 and said stylus arm, to both of which it is pivotally connected. Said arm 69 at its free end carries a pencil or stylus 71 which, by reason of the supporting structure above described, is forced to move under the action of the arm 64 in a straight line, which in the present instance, is parallel with the axis of rotation of the drum 34.

With the above described arrangement of parts, the liquid whose viscosity it is desired to test is introduced into the cup 20, preferably in such quantity as to completely submerge the independently rotatable member 22. At the same time a liquid such as oil, whose temperature may be varied or kept constant at will, is placed in the container 16, in amount sufficient to surround but not cover the cup 20. A properly graduated record sheet $x$ is then placed on the drum 34 and the motor 6 is put in operation so as to drive the spindle 9 and cup 20 at a definite and substantially constant speed. The disk 10 therefore tends to rotate the bar magnet 11, exerting upon it a certain torsion which is opposed by the spring 12. As a consequence, when the motor is making a certain number of revolutions per minute, the pointer is turned through a definite angle which may be noted by observing its position relatively to the graduations on the disk 14. Obviously the rotation of the cup 20 and of the liquid therein exerts a turning force upon the member 22, which, other things being equal, is directly dependent upon the viscosity of said liquid, the member 22 and hence the drum 34 being turned through a definite angle against the resistance to such torsion offered by the suspension wire or filament 27.

Obviously therefore, when the cup is turned by the motor at a certain speed, the drum is rotated from its normal or zero position, through an angle depending upon the viscosity of the liquid under test. This liquid is maintained at a temperature determined by that of the liquid in the container 16, and since this latter is in contact with the thermometric apparatus, the expansion of the bar 41 due to this temperature, moves upward the head 45, since the supporting member 40 does not appreciably vary in length under these conditions. The expansion of the bar 46, through the side rods 48, moves the heads 49 downwardly and they, with the head 45, turn the pintle 58 axially through an angle proportional to their elongation, which angle is obviously proportional to the temperature of the liquid in which they are immersed.

This angular turning of the pintle 58 on its trunnion screws 63 tends to swing the arm 64 upwardly and thereby moves the pencil or stylus 71 vertically for a distance, which in view of the foregoing conditions and structures, is likewise proportional to the temperature of the liquid in the container 16 and therefore of that in the cup 20. If now the stylus be brought into or maintained in engagement with the record sheet on the drum 34, a mark is made whose distance from a vertical line at one end of the sheet is dependent upon the viscosity of the liquid, and whose distance from the horizontal line at the bottom of said sheet is dependent on the temperature of said liquid.

Such a point is indicated at $y$ in Fig. 7 and if by any convenient means, such as a gas burner, the temperature of the liquid in the container 16 is raised while the speed of the motor is maintained constant, the viscosity of the liquid in the cup 20 is diminished in the case illustrated, so that the member 22 and hence the drum 34 are allowed to turn under the action of the wire 27 toward their normal or zero positions. As this turning occurs, the stylus will make a line on the record sheet, or if it be not maintained in contact with said sheet, it may be caused to make another mark thereon such as that indicated at $y'$. By continuing the gradual heating of the liquid in the container 16, other marks such as $y^2$, $y^3$ and $y^4$ may be made, which when connected by a line so drawn as to pass through all of them, will graphically illustrate the variation of the viscosity of the liquid in the cup 20 with the temperature of said liquid;—it being obvious that each variation of such temperature, through the bars 41 and 46, alters the angle of deflection of the pintle 58 and thereby varies the vertical distance of the stylus 71 from the bottom of the record sheet.

It is obvious that other forms of thermometric apparatus may be employed to actuate the stylus, and for example, in Fig. 8 we have shown a supporting bracket 80 of "invar" having fixed to its upper end a downwardly projecting rod or bar 81 of zinc or other suitable material. To the lower end of this bracket 80 we fulcrum a lever 82 having a short arm engaged by the free end of the rod 81, while the extremity of its upwardly extending long arm is provided with a toothed rack 83 meshing with a gear 84 fixed to or serving as the pivot of the arm 64, which as in the case illustrated in Fig. 3, is connected to the stylus lever 69 by a link 70.

Again, as shown in Fig. 9, we may mount on a bar 85 of "invar" or other equivalent material an arm 86 pivoted thereto at 87 adjacent the lower end thereof. The upper end of this arm, which is also of "invar," is provided with a toothed rack 83 engaging the teeth of a pinion 84 fixed as before to the arm 64 and in this case said arm at a suitable point on one side has a notch or projection 86ª engaged by one end of a zinc or other bar 88 whose opposite end is pivoted at 89 to the supporting structure 85. In both of these cases the expansion of the zinc rod 81 or 88 causes the oscillation of the arm 82 or 86, as the case may be, and a consequent angular movement of the arm 64 to an amount dependent upon the elongation and hence the temperature, of said zinc bars and of the fluid in which they are immersed.

We claim:—

1. The combination with a viscosity testing machine having a member whose position varies with the viscosity of the liquid under test; of a second member whose position varies with the temperature of such liquid; and a single instrument operatively associated with said members for simultaneously recording their deflections.

2. The combination with a viscosity testing machine having a member whose position varies with the viscosity of the liquid under test; of a second member whose position varies with the temperature of such liquid; and means operatively associated with said members for making a single record of the viscosity corresponding to any temperature of said liquid.

3. The combination of a viscosimeter; a temperature responsive instrument; and means operatively dependent upon both of said instruments for simultaneously recording their indications.

4. The combination of a viscosimeter; a temperature responsive instrument; and means for making a joint record of the indications in a single record of said instruments.

5. The combination with a viscosimeter of an instrument responsive to the variations of the temperature of a liquid under test; and mechanism operatively associated with the viscosimeter and said instrument for plotting the curve showing the variation of the viscosity of such liquid under varying temperature conditions.

6. The combination of a rotary member; a viscosimeter having one of its elements connected to deflect said member through an angle dependent upon the viscosity of the liquid under test; and an instrument responsive to changes in the temperature of such liquid including an element mounted to coöperate with the rotary member to make a record of the viscosity of said liquid at any temperature.

7. The combination of a viscosimeter having a rotary driving member; a record drum; a liquid containing cup; and a structure mounted thereon, of which the drum is connected to one of the two elements comprised by the structure and the cup, and the driving member is connected to the other; with an instrument responsive to changes of temperature of the liquid in the cup and mounted to coöperate with said drum to form a record.

8. The combination of a viscosimeter having a rotary driving member; a record drum; a liquid containing cup; and a structure mounted therein, of which the drum is connected to one of the two elements comprised by the structure and the cup, and the driving member is connected to the other; a liquid bath surrounding said cup; with an instrument responsive to changes of temperature of the liquid of said bath and mounted to coöperate with said drum to form a record.

9. The combination of a liquid container; a cup rotatably mounted therein; means for driving said cup; a body extending into the cup in position to be acted on by a body of liquid rotating with the cup; a structrue for supporting a record and connected to be deflected by said body; with means coöperating with said record supporting member to indicate the temperature corresponding to the viscosity of the liquid in the cup.

10. The combination of a rotary cup containing liquid to be tested; an element mounted in the cup in position to be deflected by said liquid; a structure connected to said element for supporting a record; and means for indicating on such record the viscosity corresponding to any particular temperature of the liquid under test.

11. The combination of a liquid container; a rotary cup extending into the same and holding liquid whose viscosity is to be tested; a body rotatably mounted in said cup; a structure for supporting a record sheet and connected to be deflected by said body; with a thermometric device extending into the container and including means coacting with the record sheet to indicate at any temperature the viscosity of the liquid in the cup.

12. The combination of a rotary cup containing liquid to be tested; a body rotatably mounted in said cup; a record drum connected to said body; with a temperature-responsive device having a portion at the temperature of the liquid in the cup and including a member for making a record on said drum.

13. The combination of a supporting structure; a rotary cup containing liquid whose viscosity is to be tested; a body suspended from said structure and extending into said cup; a tube substantially coaxial with the axis of rotation of said body; a drum fixed to said tube; and means for making on said drum a record of the viscosity, at any given temperature, of the liquid in the cup.

14. The combination in a viscosimeter of a rotary container for liquid to be tested; a supporting structure; a torsion element attached to said structure; a body mounted in said container and having the torsion element connected to it adjacent its lower end; and means for indicating the viscosity of the liquid in the container when the latter is turned at a definite speed, the same including a rotary drum and a temperature responsive device including a pencil operative on said drum.

15. The combination of a supporting structure; a rotary container for liquid to be tested; a torsion element hung from said structure; a body mounted coaxially within the container and having said torsion element connected to its lower portion; a tube fixed to said body and extending therefrom around said torsion element, a second tube concentric with the first tube and also attached to said body; a drum carried by the second tube; and means for making on said drum a record of the viscosity of a liquid in the container under predetermined temperature conditions.

16. The combination of a relatively fixed container; a second container holding liquid to be tested and rotatably mounted in said fixed container; a body suspended within the second container; a device responsive to changes of temperature of the liquid in said container; with mechanism for causing said body and device to coöperate to make a joint record of the indication of said instrument and of the deflection of said suspended body when the second container is rotated.

17. The combination of a viscosimeter including a rotary structure; means for driving said structure; a device for indicating the speed of the structure; a body mounted to be acted on by liquid rotated by said structure; a temperature-responsive device; and automatic mechanism for causing the body and said device to coöperate to make a joint record of the the indication of said device and of the deflection of said body when the rotary structure is driven at a predetermined speed.

18. The combination of a supporting structure; a container mounted thereon; a shaft extending through the bottom of said container; a cup carried by said shaft and holding liquid to be tested; means for rotating the shaft and cup; a rotatable mounted body extending into the cup; a thermometric device responsive to changes of temperature in said container; and two elements mounted to coöperate to simultaneously record the indication of said device and the deflection of said body when the cup is rotated.

19. The combination of a supporting structure; a liquid container mounted thereon; a tubular shaft extending vertically through the bottom of said container and terminating in a cup holding liquid to be tested; a valve for controlling the flow of liquid through said tubular shaft; means for driving said shaft; a stuffing box for preventing leakage between the container and said shaft; means for rotatably suspending a body in said cup; and means for indicating the viscosity of the liquid in the cup when the latter is driven at a predetermined speed.

20. The combination in a viscosimeter of a supporting structure; a rotary cup for liquid to be tested; a torsion element hung from said supporting structure; a body in the cup having said torsion element extended through and attached to it adjacent its lower end; means for rotating said cup; and a device for centering said body in the cup when the latter is rotated.

21. The combination of a viscosimeter including a member whose deflection under conditions of use is proportional to the viscosity of a liquid under test; with a thermometric device exposed to the temperature of said liquid and including a movable element coacting with said member of the viscosimeter to form a record.

22. The combination of a viscosimeter including a drum whose deflection under conditions of use is proportional to the viscosity of a liquid under test; with a thermometric device exposed to the temperature of said liquid and including a stylus coacting with said drum to form a record.

HARVEY C. HAYES.
GEORGE W. LEWIS.